Sept. 26, 1933. G. T. BALFE 1,928,585
GASKET
Original Filed Sept. 26, 1930  3 Sheets—Sheet 1

Inventor
George T. Balfe
By Cushman, Buycuit & Darby
Attorneys

Sept. 26, 1933.    G. T. BALFE    1,928,585
GASKET
Original Filed Sept. 26, 1930    3 Sheets-Sheet 2

Inventor
George T. Balfe
By Cushman, Bryant Darby
Attorneys

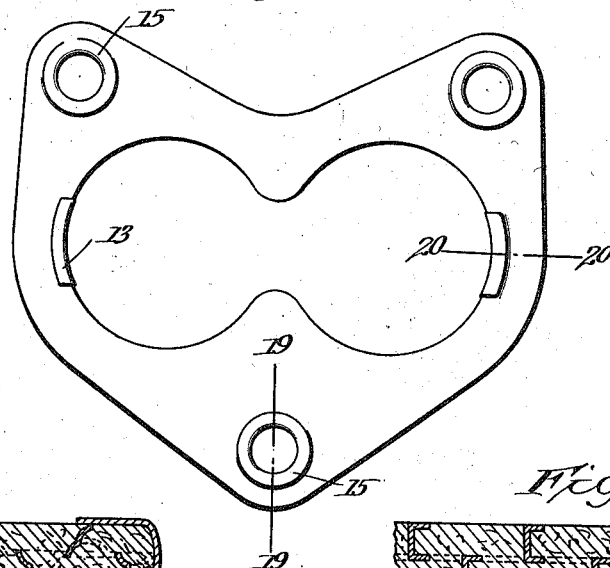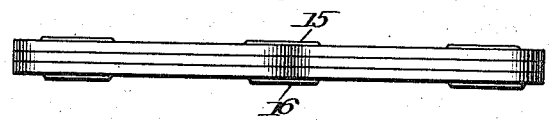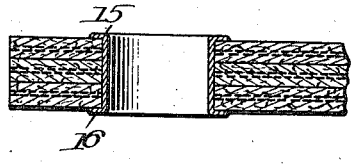

Patented Sept. 26, 1933

1,928,585

UNITED STATES PATENT OFFICE 1,928,585

GASKET

George T. Balfe, Detroit, Mich., assignor to Detroit Gasket & Mfg. Co., Detroit, Mich., a corporation of Michigan Original application September 26, 1930, Serial No. 484,651. Divided and this application January 3, 1931. Serial No. 506,441

3 Claims. (Cl. 288—1)

This invention relates to gaskets and particularly gaskets for use in the automotive arts, as for example, gaskets used on various parts of internal combustion engines such as cylinder heads and attachments therefor such as carburetors.

I contemplate primarily a laminated gasket in which a suitable reinforcement means is provided at the spots of greatest heat and pressure, serving to reinforce the laminations at their edges and in all three directions of strain, namely width, length and thickness. That is I provide continuous longitudinal and transverse barriers internally and externally about the exposed edge portions of the gasket and in some cases upon one or both sides of the gasket.

The reinforcement preferably takes the form of a separate member applied to the exposed edges of the gasket and to the adjacent surface of the gasket, where I have observed that the greatest heat and pressure is exerted and which spots are thus subjected to the most intense strain and wear.

On the other hand, the reinforcement or protecting means may take the form of an additional layer coextensive with the area of the gasket or with a portion thereof, in accordance with the character of the gasket and the conditions under which it is used.

My invention is adapted for application to the construction shown in my pending case, Ser. No. 402,589, now Patent No. 1,927,450, patented September 19, 1933, as well as that disclosed in my patent, No. 1,776,140, and the invention is also applicable to the construction shown in my pending applications, Ser. Nos. 482,098 and 482,099, wherein a metal insert, preferably of sheet metal, having tangs projecting therefrom is employed.

The invention is particularly useful with the constructions set forth in these pending applications and patent since it is applied to the gasket by means of pressure. In this manner the tangs are caused to be embedded more completely into the gasket forming material layers and where my insert comprises protuberances and cavities, the material is more completely embedded within the cavities and the protuberances and tangs are more effectively lodged in the gasket forming material. It is a further object of my invention to employ a reinforcement which is bendable about the exposed edges of the gasket and capable of being placed upon or embedded into the adjacent surface portions of the gasket. With a construction such as shown in my above mentioned applications and patent, not only does this pressure serve to more completely bind the layers and insert together, but the reinforcement permanently maintains the excellent binding relation which is accomplished by its application as above described.

A further object of the invention is to densify the gasket forming material and more completely embed the insert within such gasket forming material as well as to deform the tangs to a degree that they very effectively clench the fibers of the layers.

It is a fundamental object of this invention, therefore, to have those portions of the gasket adjacent the exposed edges thereof as resistant as possible to the action of heat and pressure and strain incident to wear, since I have found that such portions are subjected to the greatest wear.

My invention also contemplates a laminated gasket provided with a reinforcement in which two or more of the complete articles described in my above mentioned pending applications and patent are united by a metallic or other reinforcement and wherein the exposed edges of the several layers and the surface portions of the gasket adjacent thereto which are subjected to the greatest wear in actual use, are thoroughly protected against any possibility of tearing or disintegration.

In the drawings,

Figure 17 is a further modification of my invention showing a gasket built up of layers of the complete gasket forming material shown in my pending applications and patent.

Figure 18 is a side elevation.

Figure 19 is a section showing one form of reinforcement and securing means applied to the construction shown in Figures 17 and 18.

Figure 20 illustrates a further modification of the reinforcement and securing means applied to the construction shown in Figure 17.

Figure 21 is a detail sectional view, showing the reinforcement embedded in the surface of the gasket material to lie substantially flush therewith.

Figure 22 is a detailed view in section showing my reinforcement applied to a gasket constructed in accordance with my pending application Serial Number 402,589 now Patent No. 1,927,450, patented September 19, 1933.

Figure 23 is a similar view showing my reinforcement applied to a gasket constructed in accordance with my patent issue Number 1,776,140.

Figure 24 is a similar view showing the reinforcement compressed into the exposed surfaces of the gasket material layers.

Figure 1:
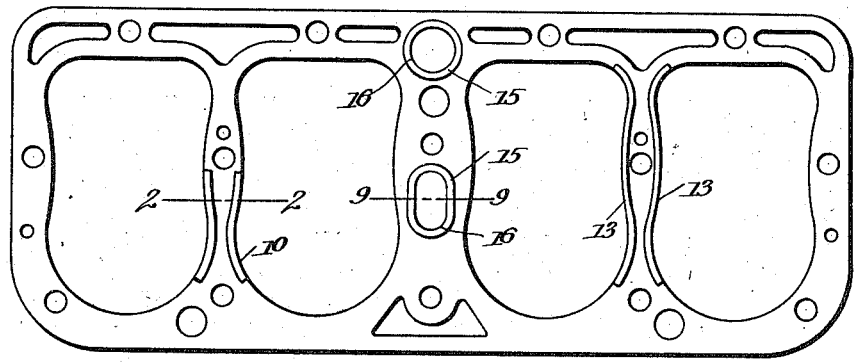
Figure 1 is a plan view of my improved gasket showing reinforcements applied thereto.

Referring to the drawings, Figure 1 shows a gasket of conventional form as applied to cylinder heads, being constructed after the manner of my pending application Serial No. 402,589 or my Patent No. 1,776,140, as shown in detail in Figures 10, 22, 23 and 24.

At this point, it will be understood that the disclosure of this application is applicable to the constructions shown in my pending cases, Ser. No. 402,589, Ser. No. 482,098 and Serial No. 482,099.

In describing the invention, it will be considered as applying to the constructions of all of the said pending applications and patent. That is, the reinforcement is applied to the construction shown in application Serial Number 402,589 wherein the triangular tangs extend through the gasket material layers and have their ends bent over and clinched to lie flush with the exposed plane surface of said gasket material layers and hence are in contact with the metallic reinforcement which is compressed thereover as shown in Figures 22 and 24. The same is true with respect to Figure 23 wherein a gasket constructed in accordance with my Patent 1,776,140 is employed, in which the tangs forming an extended side wall of the depression, that is, extending beyond the apex of the protuberance, penetrate through the gasket material layers and have their ends similarly bent and clinched over to lie flush with the exposed plane surface of the gasket material layers and in contact with the metallic reinforcement which is compressed thereover. Briefly stated, the gaskets of said application and patent comprise cushion layers and a substantially coextensive metal insert layer therebetween. The tongue-like projections formed on said insert layer extend into each cushion layer to the outer surfaces thereof and have their ends bent and clenched over the cushion layers at the surfaces without extending thereabove.

Figure 2:
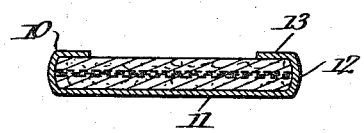
Figure 2 is a sectional view on the line 2—2 of Figure 1.

The reinforcement shown in Figure 1 is illustrated in section in Figure 2 and comprises a strip of material preferably metal such as copper, steel, alloy metal, and in fact any material which can be used in thin sheets and suitably bent into an element having a substantially U-form with opposed free end or side portions.

A resilient material may be employed, since in some cases I have found springiness to be desirable in that the reinforcement may be resiliently slipped over or snapped over the edges of the gasket and applied in that manner as well as with pressure.

The reinforcement shown in Figure 1 is indicated at 10 and comprises a strip of material as above described. It is constructed or bent to have a connecting web portion embracing one surface of the gasket defined between exposed apposite edge portions of adjacent openings as shown at 11 with its ends covering the adjacent exposed opposite edges as shown at 12 and further bent to have its free end or side portions each embrace a portion of the opposite surface of the gasket adjacent the edges as shown at 13. The reinforcement will have the contour of the edges of the gasket to which it is applied as shown in Figure 1 and while I have illustrated it as embracing completely only one surface of the gasket, obviously the width of the reinforcement may be greater so that it will completely embrace the opposite side as well.

Figure 3:
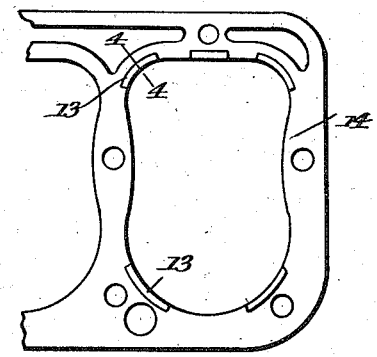
Figure 3 is a plan view partly cut away showing the reinforcements applied about the gasket, it being understood that the reinforcement may continue about the exposed edge or be applied at different predetermined portions.
Figure 4:
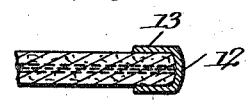
Figure 4 is a view showing in section the type of reinforcement employed in connection with Figure 3 and is taken on the line 4—4 thereof.

The modified form of reinforcement is shown in Figures 3 and 4 and may engage continuously about the exposed edges 14 of the gasket or portions thereof as shown. This modification comprises a strip of material bent into the substantial U-form as shown in Figure 4, having a connecting web covering the exposed edges and free end or side portions disposed upon the opposite surface of the gasket forming material adjacent said edges. The reinforcement may likewise be of a greater width so as to embrace to a greater extent or completely the surface portions of the gasket.

While I have indicated in Figures 1, 2, 3, and 4, a reinforcement formed of a strip of material suitably bent to embrace the required portion of the gasket, it will be understood that I may reinforce the bolt holes and water openings as well. I have shown at 15 a circular reinforcement likewise U-shaped in vertical cross section which pierces the water hole completely covering the exposed edges of the laminations and having its ends bent over to embrace the portions of the gasket adjacent the edges as shown at 16.

The reinforcement may be applied at any point of the gasket or any spot which is subjected to abnormal strain and wherein the construction shown in Figures 2 and 4 or that shown at 15—16 in Figure 1 can be employed.

The reinforcing means referred to is applied by pressure to the gasket forming material and is secured thereto in the manner, being embedded within the gasket material forming layers as shown in Figure 24 and in contact with the tangs or projections.

By this construction, the gasket forming material is densified and moreover, is more securely bound to the insert. In other words, the tangs are more effectively embedded in the gasket forming layers and clenched thereto and the gasket forming layers are more effectively embedded in the cavities of the insert when such construction is availed of.

It is to be observed that the U-shaped element cooperates with the projections on said insert layer and with the body of said insert layer to form substantially continuous longitudinal and transverse barriers internally and externally about the exposed edge portions of the gasket. That is to say, the sides of the element and the insert layer provide external and internal barriers respectively, and the projections extending throughout the thickness of the gasket provide internal projections so that at the points of abnormal strain there is in effect continuous external and internal barriers and the projections which cooperate with these longitudinal barriers extending transversely thereto likewise form a continuous series of spaced internal barriers.

Therefore, those portions of the gasket which are subjected to abnormal strains are tougher and more resistable to the heat and pressure and hence it will resist burning out, tearing, and disintegration. The reinforcing material being preferably of metal, when placed about the exposed portions of the gasket will be substantially permanent and will remain undistorted so that the effective clenching or binding of the material to the insert will be constant throughout the life of the gasket.

This rendering of the gasket material of dense formation and securing an optimum clenching and binding of the insert and gasket forming material layers, by the application of the reinforcement to the points of greatest wear, namely the exposed edges and adjacent surface portions will render the gasket immune to the vibration of the motor or other connection and thus reduce the possibility of disintegration and tearing to a minimum. In this manner, the gasket material is rendered so dense and the fibers are bound so close to the insert that the heat and pressure or the action of gases, or vibration, will not in any way affect the structure.

The reinforcing member, as stated, is applied by means of pressure and it will be understood, as stated heretofore, that such reinforcement of resilient material may be snapped over the edges and resiliently held thereto, with the application of the required amount of pressure to densify the material and obtain the effective binding above mentioned.

When the reinforcement is applied by pressure, resulting in a consequent decrease in thickness of the gasket, the thickness of the reinforcement will compensate for such decrease, so that a gasket of substantially uniform thickness and reinforced at the vital spots will be provided, as shown in Figure 21. In other words, the reinforcement is embedded in the gasket material to the appropriate extent.

Figure 5:
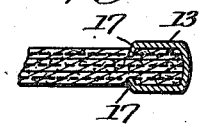
Figure 5 is a sectional view of a reinforcement which is provided with tangs adapted to be compressed into the surface layer of gasket forming material.
Figure 6:
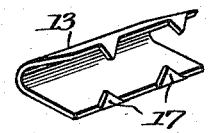
Figure 6 is a perspective view of one form of such a reinforcement.
Figure 8:
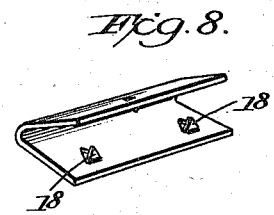
Figure 8 is a further modification of the reinforcement.
Figure 10:
Figure 10 is a sectional view conventionally showing an insert material in accordance with my Patent No. 1,776,140.

In Figures 5 and 6, I have shown the reinforcement provided with spaced tangs 17 formed from each edge of the reinforcement. When such reinforcement is applied to the gasket, the tangs will be embedded also within the gasket forming material to more firmly secure the reinforcement in place. A substantially similar construction is illustrated in Figure 8 wherein the tangs 18 are formed or struck from the body of the reinforcement.

Figure 7:
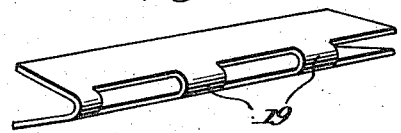
Figure 7 is a view in perspective showing another type of reinforcement.

In Figure 7, the reinforcement is shown as having spaced connecting portions 19. In some cases, the reinforcement shown in Figure 7 may have but one connecting portion 19 and in others as many may be employed as required, depending somewhat upon the length and contour of the reinforcement.

Figure 9:
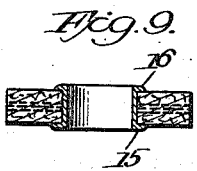
Figure 9 is a sectional view showing a further form of reinforcement.

I have illustrated in Figure 9 a detailed sectional view of the reinforcement 15—16. Such reinforcement, as described, will completely enclose the exposed edges of the laminations of the gasket and its ends will be bent over to embrace the portions of the gasket adjacent said edges, and be embedded therein by a suitable pressure.

Figure 11:
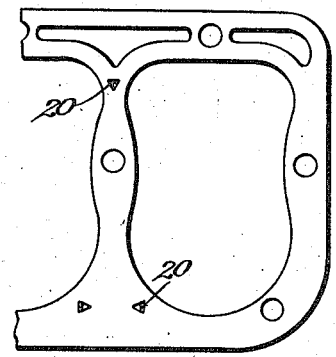
Figure 11 is a view of a further modification of the invention comprising a layer of reinforcement material which may be coextensive with the gasket or a portion thereof and which is provided with struck-out tangs adapted to be embedded within the gasket forming material.

In Figure 11, a layer of reinforcing material is secured to the gasket upon one or both sides by means of tangs 20 which are struck therefrom. This layer may be coextensive with the gasket or with a portion thereof. In lieu of tangs 20, a suitable adhesive may be employed or any suitable securing means utilized. The layer of material may be bent out as shown at 21 to embrace a portion of the exposed edges of the gasket in which event the tangs or securing means may not be necessary, or it may have bent over portions 22 completely embracing the exposed edges of the gasket and being further bent over at 23 to embrace a portion of the gasket upon the opposite side adjacent said edges.

Figure 12:
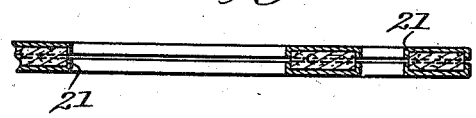
Figure 12 is a view in section of an additional modification in which the reinforcing layer is not provided with tangs, but is provided with bent over portions embracing the edges or a portion thereof.

With the construction shown in Figure 12, two layers of reinforcing material may be employed, one upon each side, as shown.

Figure 13:
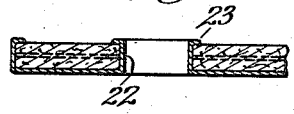
Figure 13 is a sectional view in which the reinforcement consists of a layer as above described and has portions thereof bent over the exposed edges and further bent to embrace a portion of the opposite surface adjacent said edges.

With the construction shown in Figure 13, the engagement of the reinforcement with the opposite side of the gasket may be increased so as to embrace a greater portion or area of the opposite side of the gasket.

Figure 14:
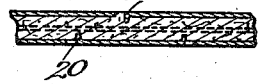
Figure 14 is a view in which the reinforcing material is provided with tangs, showing in section the manner in which the reinforcement engages the gasket forming layer with its tangs embedded therein.

The disclosure in Figure 14 shows the manner in which the tangs 20 are embedded within the gasket forming material layer when gaskets of the type described are provided with my reinforcement.

Figure 15:
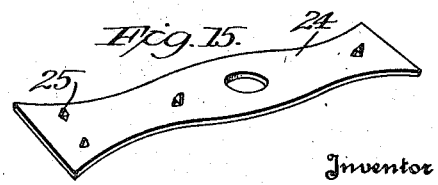
Figure 15 is a perspective view of a reinforcement adapted to be applied at various spots and which is provided with suitable tangs adapted to be forced into the gasket forming layer, the curvature of the edges of the reinforcement, as with the other modifications, conforming to the contour of the edges of the gasket.

Figure 15 discloses a construction for reinforcing a particular point or spot on the surface of the gasket, adjacent the edge and a strip of material 24 having a contour conforming to that of the point to be reinforced is employed, provided with suitable tangs 25. This strip 24 may have its edges bent over in the manner hereinbefore described.

Figure 16:
Figure 16 is a view of a gasket built up after the manner set forth in my pending applications and patent above referred to and particularly my patent, wherein the completed gasket will consist of two or more layers of gasket forming material with an insert such as set forth in my pending cases and patent interposed between the respective layers.

In Figure 16 I have shown a further type of laminated material similar to that set forth in my pending applications and patent, in which three or more layers of gasket forming material are built up and bound by means of inserts interposed between the respective layers. The layers are indicated at 26 and the inserts at 27. With such a construction, a gasket of any desired thickness can be easily obtained and is substantially indestructible.

It will be understood that the reinforcement disclosed in this application is likewise applicable to this built up construction.

With respect to the construction illustrated in Figure 16, the inserts set forth in my pending cases and patent can be employed without change or if desired, the particular positioning and spacing of the tangs, protuberances and cavities of the insert may be modified.

In Figure 17, I have shown a laminated gasket composed of two or more layers of the complete material illustrated in my said pending applications and patent.

In this construction, reinforcements of the type shown at 15—16 are employed and in addition to reinforcing the gasket in the manner described, secure the laminations together. The reinforcements illustrated in Figures 1 to 16 may be employed in connection with this construction and it will be noted that the gasket is reinforced at its exposed edges and at the points which are subjected to the greatest wear.

The type of gasket shown in Figures 16 and 17 having ferrule shaped reinforcements 15—16, is particularly designed for use in the connection between a carburetor and manifold. By reason of its thickness and construction it will serve to dissipate and absorb the heat at the same time providing a complete seal throughout the jointure between the manifold and the carburetor. By no possibility can a burning out or disintegration, or chemical action interfere with the seal. Moreover, the construction will not warp or bend or be otherwise distorted in use and there is no metal to metal contact such as is sometimes undesired. Such construction is a decided improvement over paper or flexible packings which are unsatisfactory due to the action of the gases and resultant hardening producing brittleness and cracking. These defects are overcome in the present structure.

Instead of employing a laminated construction in which the laminations are bound together by a metallic insert provided with means penetrating the gasket forming material, I may use a plain flat insert of metal or other strengthener and secure the loosely assembled layers together by means of the several forms of reinforcements shown and described in this application.

I may, moreover, obviate the use of tangs, protuberances, and cavities and simply glue the asbestos sheets to a suitable insert and bind the whole effectively by means of my reinforcement. Primarily, however, the reinforcement is adapted to be employed with a construction having means to engage and clench the gasket forming material and when so used, the clenching means is caused to effectively engage and bind the gasket forming layers to the insert and this optimum clenching with resultant densifying of the gasket is made constant since the reinforcement is permanently embedded in or secured to the gasket and will be substantially non-deformable when applied.

With the reinforcement herein described, the gasket at and adjacent its edges is reinforced along all three lines of strain, namely throughout its thickness, transversely, and longitudinally.

The reinforced gasket of this invention is adapted for use with types of high compression motors which have dangerous spots where the heat and pressure, vibrations, and action of the gases, are such that any composite gasket would be subjected to abnormal strains and wear, and would in cases where the motor has some defective characteristics, be rendered ineffective. With the present construction, the gasket is adapted for use with motors wherein the gasket is subjected to unusual and abnormal conditions and is likewise useful in any connection in which a wearproof gasket is necessary to meet uncertain and extraordinary tests.

As herein states, the reinforcing means not only serves to more effectively densify and bind the gasket at the points of greatest wear but likewise acts as an auxiliary or the single securing means, as with the modifications last referred to, it constitutes the only securing means for maintaining the layers firmly together.

In the construction of my gasket the gasket forming material may be asbestos, rubber, cork, or treated paper and may be applied in sheet or plastic form or as a pulp. The gasket forming material is treated with a waterproofing agent such as oleates, rubber mixtures, stearates, resinates, asphalts, and bitumens. In fact any suitable waterproofing material which will withstand the heat and pressure and the action of gases characteristic of the conditions of use of the gasket may be employed.

These various waterproofing agents may be mixed with or incorporated in the pulp or plastic material before it is formed into a sheet, or sheets of gasket material may be preformed and thereafter dipped into the waterproofing agent so as to be thoroughly impregnated and coated therewith. Also I have found that instead of a dipping process the waterproofing material may be flowed, sprayed, or otherwise spread upon the preformed sheet. Whether the waterproofing agent is incorporated with the plastic material or applied to the preformed sheet, pressure may be utilized to assist in a thorough permeation and coating of the entire mass of gasket material.

I may furthermore, form a complete gasket in accordance with this invention or my previous inventions and subject it to either the dipping process or the spreading process, with or without pressure for the purpose of impregnation with a waterproofing material.

In some cases the finished article may be covered with graphite, bronzing powder, aluminum powder, and metallic powder with which are suitably combined some form of binding to form a heat resistant external coating or covering for the final article. This use of a metallic coating for the finished gasket is also useful when there is any evidence that the gasket may stick to the head or other part to which it is applied.

As hereinbefore stated, the reinforcement will conform to the contour of the edges or surfaces of the gasket to which it is applied. Thus, where the reinforcement is employed in connection with a curved edge or surface, the metallic strip is first cut away or corrugated to avoid crimping caused by the presence of metal when the bending is accomplished.

Referring to Figures 2, 4, 5 and 6, as well as Figures 9 and 13, the reinforcement may have one or both of its edges bent inwardly so as to provide a biting edge, serving in lieu of the tangs, to bind the reinforcement member securely in position. In other words, one or both of the longitudinal edges of the reinforcement will be turned in and when the reinforcement is applied, such biting edge will be embedded within the gasket forming layer or layers. A similar construction may be utilized in connection with the ferrule shaped reinforcement and securing members and if desired, portions of the peripheral flanged edge 16 or 23 may be turned over or bent in as described. The provision of inwardly bent edges in lieu of tangs such as are shown in Figures 6 and 8 may be desirable in some cases and will effectively secure the reinforcements in position.

Referring to the drawings, it will be seen that in applying the reinforcement by pressure, the gasket material layers adjacent the exposed edge portions will be additionally compressed and densified to produce a more secure penetration and seating of the projections in the fibrous material. What is more, however, the portions subjected to the greatest strain namely, the exposed edges and adjacent surface portions, are not only densified and strengthened, but the reinforcing member cooperates with the insert and projections to substantially enclose the densified portions, as shown in detail in Figure 21. Thus, the reinforcement forms at least one side and end of such enclosure on each side of the insert; the insert cooperates on each one of its faces to form a further side, and the projections by reason of their closely compacted relationship form the other sides. Hence, the densified and compressed portions at the points of greatest wear are substantially enclosed and no opportunity is afforded for even the most abnormal strains to produce disintegration.

This application is a division of my pending application, Serial No. 484,651, allowed December 9, 1930, now Patent No. 1,788,041.

I claim:

1. A gasket having openings and comprising cushion layers and a substantially coextensive metal insert layer therebetween, said metal layer having throughout its area closely compacted projections extending into each cushion layer to the surfaces thereof, said projections having their ends bent and clenched over the cushion layers at the surfaces thereof without extending thereabove, and an element of sheet metal substantially U-shaped in cross section applied to exposed edge portions of the gasket at certain of said openings and having portions compressed upon opposite sides of said gasket so that the material of the cushion layers is densified between said insert layer and the area comprehended by said U-shaped element, said element cooperating with the projections of said insert layer and with the body of said insert layer to form substantially continuous longitudinal and transverse barriers internally and externally about the exposed edge portions of the gasket.

2. A gasket having openings and comprising cushion layers and a substantially coextensive metal insert layer therebetween, said metal layer having throughout its area closely compacted projections extending into each cushion layer to the surfaces thereof, said projections having their ends bent and clenched over the cushion layers at the surfaces thereof without extending thereabove, and an element of sheet metal substantially U-shaped in cross section applied to exposed edge portions of the gasket at certain of said openings and having free side portions compressed upon opposite sides of said gasket so that the material of the cushion layers is densified between said insert layer and the area comprehended by the sides of the U-shaped element, said element cooperating with the projections of said insert layer and with the body of said insert layer to form substantially continuous longitudinal and transverse barriers internally and externally about the exposed edge portions of the gasket.

3. A gasket having openings and comprising cushion layers and a substantially coextensive metal insert layer therebetween, said metal layer having throughout its area closely compacted projections extending into each cushion layer to the surfaces thereof, said projections having their ends bent and clenched over the cushion layers at the surfaces thereof without extending thereabove, and an element of sheet metal substantially U-shaped in cross section applied to exposed opposite edge portions of the gasket at certain of said openings and having a connecting web portion and integral free side portions, said web and side portions compressed respectively upon opposite sides of said gasket so that the material of the cushion layers is densified between said insert layer and the area comprehended by the web portion and side portions of the U-shaped element, said element cooperating with the projections of said insert layer and with the body of said insert layer to form substantially continuous longitudinal and transverse barriers internally and externally about the exposed edge portions of the gasket.

GEORGE T. BALFE.